J. HOOVER.
Draft-Equalizer.
No. 46,904. Patented Mar. 21, 1865.
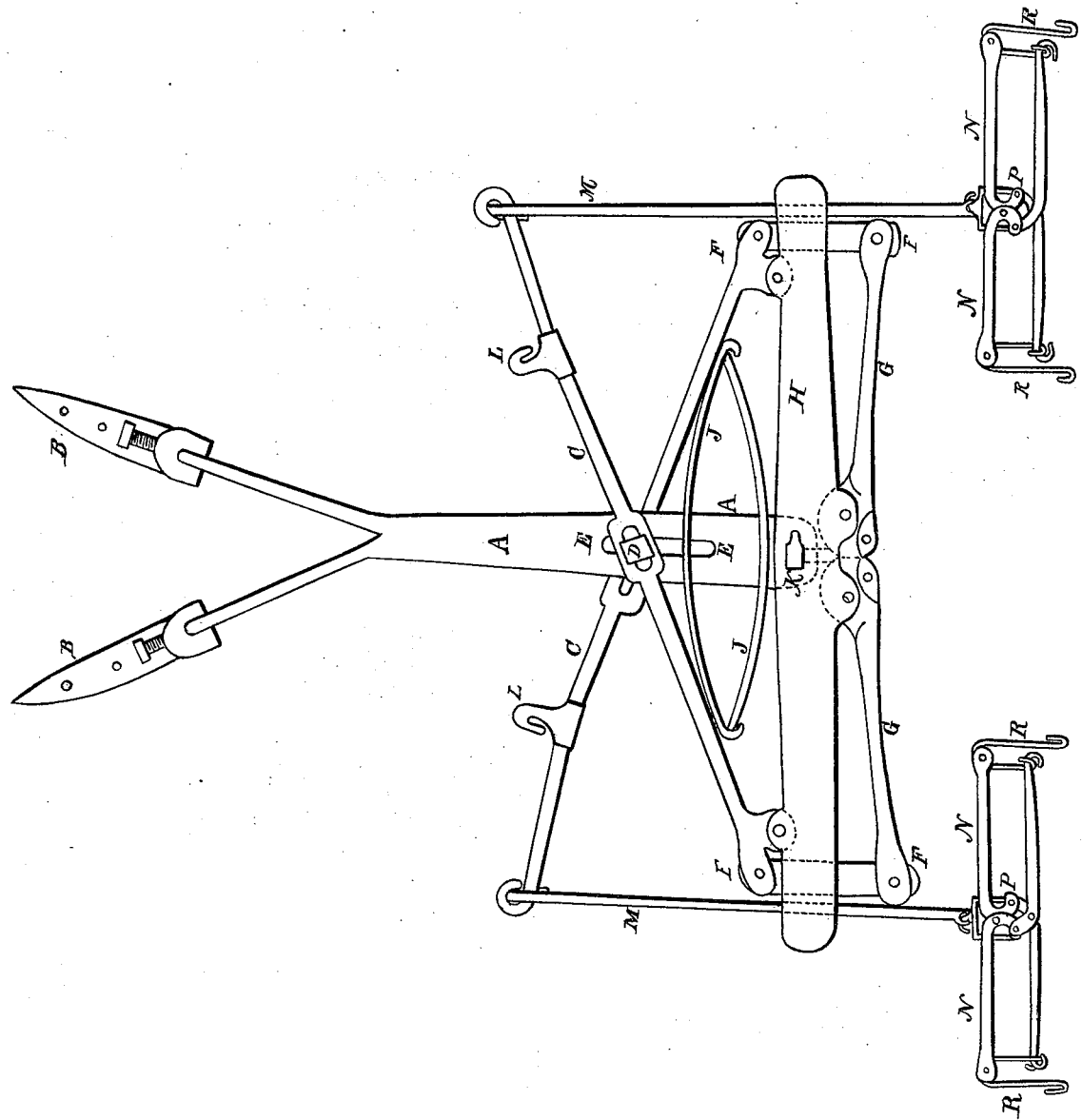
Witnesses:
Harry S Dulany
L. Licks
Inventor:
John Hoover
by his Attorney
J. Franklin Reigart

UNITED STATES PATENT OFFICE.

JOHN HOOVER, OF MANCHESTER, MARYLAND.

IMPROVEMENT IN DOUBLE-TREE FOR CARRIAGES.

Specification forming part of Letters Patent No. 46,901, dated March 21, 1865.

*To all whom it may concern:*

Be it known that I, JOHN HOOVER, of Manchester, Carroll county, and State of Maryland, have invented new and useful Improvements in Double-Trees for Wagons; and I do hereby declare the following to be an exact description thereof, reference being had to the accompanying drawings, and to the letters of reference marked thereon, making a part of this specification.

The nature of my invention consists in two elastic cross-levers, (operating on an elliptical spring,) connected with two front levers and two side or draft-irons connecting with the elastic single-trees.

A represents the main draft-iron, with its two screw-plates, B B, at the back end, for the purpose of attaching the draft-iron to the hounds or front axle of a wagon. C C are two spring-levers crossing the draft-iron A, and coupled with it at their centers by a bolt, D, playing in a slot, E, of the draft-iron. The one end of levers C connects by joints F F with the ends of front levers, G G, the joints F operating in slots at each end of the cross-bar H. The other ends of front levers, G G, are attached to the center of the cross-bar H by rivets. Between the cross-levers C C and the bar H is an elliptical spring, J, operating on the draft-iron A, which passes through the center of the elliptical spring J, and is attached to the bar H by the key-bolt K.

The hooks L L on the levers C C are for the purpose of attaching a chain to the front axle of a wagon.

Two side rods or draft-irons, M M, are connected by hooks to the ends of the cross-levers C C, and pass through apertures in the ends of the bar H, (the bar H supporting the rods M M,) and the single-trees N N are attached by hooks to the rods M M.

The single-trees are also made so as to be elastic, being formed of four rods, connected at their bent ends P, fastened by rivets, forming the center of the single-tree, and their outer ends connected by a hook, R, that is the draft-iron to which the traces of the harness are hooked and attached.

The object and advantages of my invention are to prevent the breaking of the traces or harness by a sudden forward movement of the horses when starting a heavy load and relieving the horses when drawing the wagon up-hill or over a rut or stones, and completely saving the horses' shoulders from being bruised and injured, as by the use of the ordinary stiff double and single trees.

What I claim as my invention, and desire to secure by Letters Patent, is—

The elastic double and single trees when arranged, constructed, and combined as herein described, and for the purposes set forth.

JOHN HOOVER.

Witnesses:
   J. FRANKLIN REIGART,
   JOHN S. HOLLINGSHEAD.